US012503670B2

(12) United States Patent
Cummings et al.

(10) Patent No.: US 12,503,670 B2
(45) Date of Patent: Dec. 23, 2025

(54) PERACID BOOSTER

(71) Applicant: Sterilex, LLC, Hunt Valley, MD (US)

(72) Inventors: Walter Daniel Cummings, New Freedom, PA (US); Gregory Rosenberg, Towson, MD (US)

(73) Assignee: Sterilex, LLC, Hunt Valley, MD (US)

( * ) Notice: Subject to any disclaimer, the term of this patent is extended or adjusted under 35 U.S.C. 154(b) by 365 days.

(21) Appl. No.: 18/073,242

(22) Filed: Dec. 1, 2022

(65) Prior Publication Data

US 2023/0203407 A1 Jun. 29, 2023

Related U.S. Application Data

(60) Provisional application No. 63/425,537, filed on Nov. 15, 2022, provisional application No. 63/293,962, filed on Dec. 27, 2021.

(51) Int. Cl.
*C11D 3/39* (2006.01)

(52) U.S. Cl.
CPC .......... *C11D 3/3932* (2013.01); *C11D 3/3947* (2013.01)

(58) Field of Classification Search
CPC ............................ C11D 3/3932; C11D 3/3947
See application file for complete search history.

(56) References Cited

U.S. PATENT DOCUMENTS 4,051,058 A 9/1977 Bowing et al.
5,567,444 A * 10/1996 Hei ...................... C11D 3/3947 510/234
6,475,967 B1 11/2002 Arvanitidou et al.
6,617,290 B2 9/2003 Lopes
8,197,605 B2 6/2012 Laffitte et al.
10,255,466 B2 4/2019 Jinadatha
2004/0157931 A1 8/2004 Ra et al.
2007/0163779 A1 7/2007 Rae
2011/0315168 A1 12/2011 Laffitte et al.
2016/0345576 A1 12/2016 Rovison et al.
2017/0128605 A1 5/2017 Franciskovich et al.
2018/0064123 A1 3/2018 Gutzmann et al.
2018/0187129 A1 7/2018 Traistaru et al.
2018/0265825 A1 9/2018 Park
2019/0045789 A1 2/2019 Daigle
2020/0345005 A1* 11/2020 Tinwala ................. A01N 41/04
2021/0087499 A1* 3/2021 Marchand ............. C11D 1/722
(Continued)

FOREIGN PATENT DOCUMENTS

EP 0 783 245 A1 7/1997
EP 1 721 961 A1 11/2006
EP 3 797 592 A1 3/2021
(Continued)

OTHER PUBLICATIONS

International Search Report and Written Opinion for PCT/US2022/051546 dated Apr. 4, 2023, 14 pages.

*Primary Examiner* — Angela C Brown-Pettigrew
(74) *Attorney, Agent, or Firm* — Frost Brown Todd LLP; Nicole M. Tepe

(57) ABSTRACT

Aqueous compositions having an acidic pH comprise a primary organic acid, an ancillary organic acid that is different from the primary organic acid and a biodispersant. The aqueous compositions can be added to peracid containing disinfectant/sanitizer solutions to increase efficacy of peracids contained therein against microorganisms and/or biofilms.

15 Claims, 3 Drawing Sheets

(56) References Cited

U.S. PATENT DOCUMENTS

| | | | |
|---|---|---|---|
| 2021/0171871 | A1 | 6/2021 | Bodoc et al. |
| 2021/0259245 | A1 | 8/2021 | Li et al. |

FOREIGN PATENT DOCUMENTS

| | | | |
|---|---|---|---|
| MX | 2015017441 | A1 | 6/2017 |
| MX | 2017001831 | A1 | 8/2018 |
| WO | WO 2016/102606 | A1 | 6/2016 |
| WO | WO 2020/139586 | A1 | 7/2020 |

* cited by examiner

PERACID BOOSTER

CROSS-REFERENCE TO RELATED APPLICATION

This application claims priority to, and the benefit of, U.S. Patent Application No. 63/293,962, entitled "Peracetic Acid Booster," which was filed on Dec. 27, 2021, and to U.S. Patent App. No. 63/425,537, which was filed on Nov. 15, 2022, entitled "Peracid Booster." The contents of the aforementioned applications are incorporated herein in their entirety for all purposes.

BACKGROUND

Peracid containing disinfectants and/or sanitizers (collectively, "peracid disinfectants/sanitizers" or "PA disinfectants/sanitizers") are used in a variety of settings to control bacteria and other pathogens. Such PA disinfectants/sanitizers can be sold in the form of an aqueous liquid concentrate that is intended for dilution with water to generate a use solution that is applied to a hard surface to be disinfected or sanitized. Some concentrated PA disinfectants/sanitizers may be sold as a kit with a separate solution to be used to dilute the concentrated PA disinfectants/sanitizers to provide for a use solution to be applied to a hard surface.

The dilution of concentrated PA disinfectants/sanitizers to produce use solutions may depend upon the intended use thereof. For example, a concentrated peracetic acid ("PAA") solution that is to be used to sanitize a hard surface, may be diluted to generate a use solution that contains PAA from about 140 to about 200 parts per million (hereinafter, "ppm"). In a further example, a concentrated PAA solution that is to be used to disinfect a hard surface, may be diluted to generate a use solution that contains PAA from 250 to about 450 ppm. While use solutions of known PAA disinfectant/sanitizers may effectively kill/control bacteria at these PAA concentrations, to additionally, or alternatively, act as a sterilant that also kill viruses and/or spores, it is believed that a significantly higher concentration of PAA in use solutions would be needed. Moreover, it is believed that known use solutions of PAA disinfectant/sanitizers are not generally found to be effective in penetrating, sterilizing and/or removing biofilms from hard surfaces without being in contact with the biofilms for 20 minutes or more and/or by comprising 800 ppm or more of total peracid (hereinafter, "PA").

Literature in the art suggests that to be sporicidal, use solutions of PAA disinfectant/sanitizers should contain at least 2,000 ppm of PAA, which is believed to be as much as 14 times the amount of PAA that would be required for a use solution that could be used to sanitize a hard surface. However, preparing and applying solutions containing such relatively high levels of PAA may result in drawbacks including, but not limited to, those that are described in U.S. Pat. Pub. No. 2016/0345576 to Rovison et al., which is incorporated by reference herein. Since PAA, and other peracids, are known to be a highly corrosive material, increasing levels of PAA and/or other peracids in concentrated PA disinfectants/sanitizers that are to be diluted to provide for use solutions that are effective as a sterilant and/or for sterilizing and/or removing biofilms from hard surfaces, may result in undesirable side effects. For example, the cost and complexity associated with making, packaging, shipping and handling of such PAA concentrates can be significantly increased. Moreover, such PAA solutions may damage the hard surfaces to which they are applied.

U.S. Pat. Pub. No. 2018/0187129 to Traistaru et al. (hereinafter, "U.S. 129") discloses acid detergent compositions that are said to be suited for removing soils, especially milk soils, from clean-in-place systems, such as those commonly used in the dairy and food processing industries. U.S. '129 indicates that its detergent compositions generally comprise an acidic component containing an inorganic acid or alkanesulfonic acid alone or optionally in combination with an organic acid or another acid, e.g., glycolic acid, which is different from the first inorganic or alkanesulfonic acid. U.S. '129 further indicates that its detergent compositions may be concentrated and that those detergent compositions can be diluted with water to make use solutions. U.S. '129 further indicates that the disclosed acid detergent compositions may include organic and inorganic peroxygen bleaches and peracids, such as hydrogen peroxide, and activated hydrogen peroxides like peracetic acid. U.S. '129 indicates that in certain embodiments, detergent concentrates exhibit a pH of less than 2, of less than 1, or from about −1 to about 1, or from about −0.7 to about 0.4, and in certain embodiments, the pH of the use solution is from about 0.1 to about 5, from about 1 to about 4, or from about 2.1 to about 2.5.

U.S. Pat. Pub. No. 2019/0045789 to Daigle (hereinafter, "U.S. '789") discloses an antimicrobial composition comprising lauric arginate ethyl ester (LAE) and hydrogen peroxide, and the use of this composition for disinfecting and sanitizing different types of surfaces such as food products, human skin and hard surfaces, as well as a method of stabilizing the composition by including a sequestering agent (citrate salt and/or phosphate salt). U.S. '789 indicates that its composition may be a concentrate composition that is diluted with tap water on site. U.S. '789 indicates that the antimicrobial composition may optionally include one or more additional antimicrobial ingredients for specific application on biopolymer or surface, for example, organic acid. U.S. '789 opines that an inhibitory mechanism of organic acids occurs via diffusion of undissociated acids across the membrane barrier of a cell and subsequent dissociation in the cytoplasm of a cell, which causes a number of physiological disruptions such as reduced intracellular pH.

U.S. Pat. Pub. No. 2021/0259245 to Li et al. (hereinafter, U.S. '245) discloses highly acidic, stabilized peroxycarboxylic acid compositions having both improved antimicrobial efficacy in comparison to conventional peroxyoctanoic acid and peroxyacetic acid compositions for sanitizing applications, and improved transport and shipping stability. U.S. '245 indicates that its low odor and low/no VOC compositions having dual functionality as both acid wash and sanitizing compositions are disclosed. U.S. '245 also indicates that an embodiment of the invention is a composition comprising: a C1-C22 carboxylic acid; a C1-C22 percarboxylic acid; hydrogen peroxide; and a stabilizing agent, wherein the stabilizing agent is a picolinic acid or a compound having the following Formula (IA):

(IA)

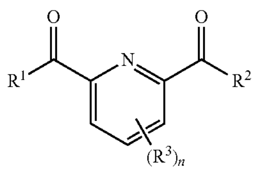

U.S. '245 indicates that its invention further provides peroxycarboxylic acid stabilizing compounds suitable for use in compositions having extreme ratios of peracid to hydrogen peroxide, wherein the concentration of the peroxyacids greatly exceed the hydrogen peroxide.

U.S. Pat. Pub. No. 2021/0087499 to Marchand et al. (hereinafter, U.S. '499) discloses peracetic compositions, methods and kits for removing biofilms from an enclosed surface. U.S. '499 further discloses compositions comprising (i) peracetic acid; (ii) at least one secondary acid; and (iii) a non-foaming surfactant. A method disclosed in U.S. '499 comprises contacting, preferably for at least 5 min, a surface with such a peracetic such composition. Another method disclosed in U.S. '499 comprises circulating such a composition into a piping system for a period of time providing for disruption and/or removal of a biofilm. U.S. '499 discloses kits comprising bottles of concentrated solutions to be mixed and diluted with water, before use. U.S. '499 indicates that compositions, methods and kits are particularly useful to remove bacterial biofilms from enclosed surfaces such as piping systems that are commonly used in the food and beverages industries. U.S. '499 discloses that according to one aspect, the invention concerns a kit for disruption of biofilm on, and/or removal of biofilm from, a surface, the kit comprising: a first bottle comprising a first concentrated solution, the first concentrated solution comprising about 3% w/w to about 30% w/w peracetic acid, and about 0.001% w/w to about 5% w/w of a surfactant; and a second bottle comprising a second concentrated solution, the second concentrated solution comprising about 1% w/w to about 50% w/w of at least one secondary acid. U.S. '499 indicates that in one embodiment, a method comprises circulating into the piping system a composition containing 800 ppm of PAA for a period of time providing for successful disruption and/or removal from the biofilm. Particularly, the circulating may be carried out for at least 5 minutes, or least 10 minutes, or at least 15 minutes, or at least 20 minutes, or at least 30 minutes or more. U.S. '499 discloses that in another embodiment, a ready to use solution comprising at least 400 ppm of PAA may be place in contact with a biofilm on a hard surface for 20 minutes. U.S. '499 indicates that while it is within the skill of those in the art to determine an acceptable period of time providing for a desired efficacy, typically a longer period of time may be preferred to achieve better biofilm removal.

U.S. Pat. Pub. No. 2017/0128605 to Franciskovich et al. (hereinafter, U.S. '605) discloses a two-part liquid composition for cleaning and disinfecting a substrate, which may be a medical device, for example, an endoscope. U.S. '605 indicates that the two-part liquid composition comprises: (A) a disinfectant medium comprising peracetic acid; and (B) a supplemental medium comprising a non-enzymatic cleaner, a corrosion inhibitor, and a chelator. The supplemental medium (B) may further comprise an enzymatic cleaner, a surfactant, a buffer, a pH modifier, or a mixture of two or more thereof. U.S. '605 indicates that the non-enzymatic cleaner comprises an alkanol amine, an alcohol ethoxylate, an alkyl glucoside, an alkylene glycol, an alkyl diproprionate, an alkyl dialkylamine oxide, or a mixture of two or more thereof. U.S. '605 discloses that the pH of the disinfectant medium (A) may be in the range from about 1 to about 8, or from about 3 to about 6, and that the pH of the supplemental medium (B) may be in the range from about 6 to about 14, or from about 6 to about 9.

U.S. Pat. Pub. No. 2016/0345576 to Rovison et al. (hereinafter, U.S. '576) discloses anti-microbial compositions that are purported to be useful against a wide range of microorganisms that are undesirable on a wide variety of materials, including food, food contact and non-food contact surfaces, and surfaces in industrial, recreational, health care, and other institutional environments. According to U.S. '576, the anti-microbial compositions more particularly comprise peracetic acid in combination with a) citric acid or a salt and b) salicylic acid or a salt in aqueous solution. Additionally, U.S. '576 indicates that the disclosed invention further includes a kit comprising: a. an aqueous peracetic acid solution; and b. a mixture comprising salicylic acid and citric acid or their respective salts in proportionate ratios ranging from about 1:5 to 1:1 by weight respectively and in a solution matrix acting as solvent of glacial acetic acid (70-90%) and water (30-5%). U.S. '576 further discloses that peracetic acid is known to be a useful antimicrobial agent. U.S. '576 further discloses that PAA's antimicrobial effect is best obtained with high concentrations (generally greater than 100 parts per million (ppm)). U.S. '576 opines that at these concentrations, the PAA has an overbearing odor, sometimes causes oxidative damage to foodstuffs and surfaces to which it is applied, and present hazards to persons handling the materials. U.S. '576 indicates that U.S. Pat. No. 4,051,058 discloses aqueous solutions of peracetic acid in concentrations of 0.5% to 20% by weight for use in sanitizing and disinfecting applications. U.S. '576 further indicates that U.S. Pat. No. 6,617,290 discloses the use of acidifying agents classified as GRAS (Generally Regarded As Safe) for use as food additives in preparations for cleaning and sanitizing food contact and non-food contact surfaces, noting that these agents include citric and lactic acids. U.S. '576 further indicates that U.S. Pat. No. 6,475,967 discloses a light duty antibacterial liquid detergent displaying foaming and grease-cutting as well as low corrosive properties, wherein the aqueous composition comprises hydroxyl-containing organic acid(s), a peracetic acid, and other components including various surfactants, and polyethylene glycol.

A need remains for PAA disinfectants/sanitizers that can be used to kill bacteria, viruses and/or spores on a variety of hard surfaces and in a variety of settings. It would be beneficial for such PAA disinfectants/sanitizers to also be effective in penetrating, sterilizing and/or removing bacterial biofilms from hard surfaces. It would also be beneficial for such PAA disinfectants/sanitizers to be useful in environmental cleaning, cleaning in place (hereinafter "CIP") and/or in cleaning out of place (hereinafter, "COP") applications in a variety of settings. It would also be beneficial for the efficacy of PAA in existing PAA disinfectants/sanitizers to be increased without having to add more PAA thereto including, but not limited to, increasing efficacy of PAA disinfectants/sanitizers such that they may penetrate biofilms and kill and/or remove biofilms from a hard surface. It would further be beneficial for a composition that can be added to a wide variety of existing PAA disinfectant/sanitizers to increase the efficacy of the PAA in existing PAA disinfectants/sanitizers, rather than formulating a PAA disinfectants/sanitizers to increase efficacy while reducing shelf stability (e.g., by adding surfactants to them). It would further be beneficial to provide a composition that can be added to PAA disinfectants/sanitizers and the resulting mixture diluted to provide for the intended end use, e.g., disinfection, sterilization, sanitization and/or biofilm penetration, kill, and/or removal.

A need remains for concentrates and use solutions of PA disinfectants/sanitizers that can be used to kill bacteria, viruses and/or spores on a variety of hard surfaces and in a variety of settings. It would be beneficial for such PA disinfectants/sanitizers to also be effective in penetrating, sterilizing and/or removing bacterial biofilms from hard surfaces. It would also be beneficial for the efficacy of PA in existing PA disinfectants/sanitizers to be increased without having to add more PA thereto including, but not limited to, increasing efficacy of PA disinfectants/sanitizers such that they may penetrate biofilms and act as sterilants and/or remove biofilms from a hard surface. It would further be beneficial for there to be a single composition that can be added to a wide variety of existing PA disinfectant/sanitizer concentrates and/or use solutions of PA disinfectant/sanitizers to increase the efficacy of the PA contained therein, rather than formulating new concentrates and/or use solutions to increase efficacy while potentially reducing shelf stability (e.g., by adding surfactants to them). It would further be beneficial to provide for compositions that can be added to existing concentrates of PA disinfectants/sanitizers, so that the resulting use solutions provide for a wide variety of intended uses including, but not limited to, disinfection, sterilization, sanitization, biofilm penetration, biofilm sterilization, removal of biofilm and combinations thereof, from hard surfaces. It would also be beneficial for such PA disinfectants/sanitizers to be useful in environmental cleaning, cleaning in place (hereinafter "CIP") and/or in cleaning out of place (hereinafter, "COP") applications in a variety of settings.

While a variety of PA disinfectants/sanitizers have been made and used, it is believed that no one prior to the inventors has made or used an invention as described herein.

BRIEF SUMMARY

Exemplary PA boosters can be foaming or low or non-foaming. Exemplary foaming PA boosters are aqueous and comprise a primary organic acid selected from: glycolic acid, benzoic acid, fumaric acid, caprylic acid, lactic acid, proprionic acid, a salt of any one of the foregoing organic acids and combinations thereof. Exemplary PA boosters further comprise an ancillary organic acid that is different from the primary organic acid, the ancillary organic acid having a carbon chain length of C6 or less, and at least one pKa of from about 2 to about 7. Exemplary PA boosters further comprise a biodispersant selected from: alkyl sulfosuccinate, alkyl sulfoacetate, alkylamide hydrolysate; a metal salt of any one the foregoing and combinations thereof. Exemplary PA boosters further comprise a chelant and a pH buffering agent. Exemplary PA boosters have a pH of from about 3 to about 4. Exemplary PA boosters may be is substantially free of components selected from: peracids; peroxides selected from: organic peroxides, inorganic peroxides and combinations thereof; inorganic acids; and combinations thereof.

Exemplary kits comprise (a) a first container containing an exemplary foaming or low/foaming PA booster and (b) a second container containing an aqueous composition comprising one or more PAs.

Exemplary methods comprise boosting efficacy of an aqueous use solution consisting of a concentrated disinfectant/sanitizer comprising one or more peracids diluted with water, so that the aqueous use solution can effectively penetrate a biofilm and kill bacteria contained therein. Exemplary methods comprise making a disinfectant/sanitizer use solution by mixing together the concentrated peracid containing disinfectant/sanitizer with water and an exemplary foaming or no/low foaming PA booster, such that the efficacy of the resulting PA use solution is boosted by from about a 2 log 10 to about 5 log 10 cycles in comparison to a use solution comprising the same concentrated peracid containing disinfectant/sanitizer and water.

BRIEF DESCRIPTION OF THE DRAWINGS

It is believed that the present invention will be better understood from the following description of certain examples taken in conjunction with the accompanying drawings.

Figure 1:
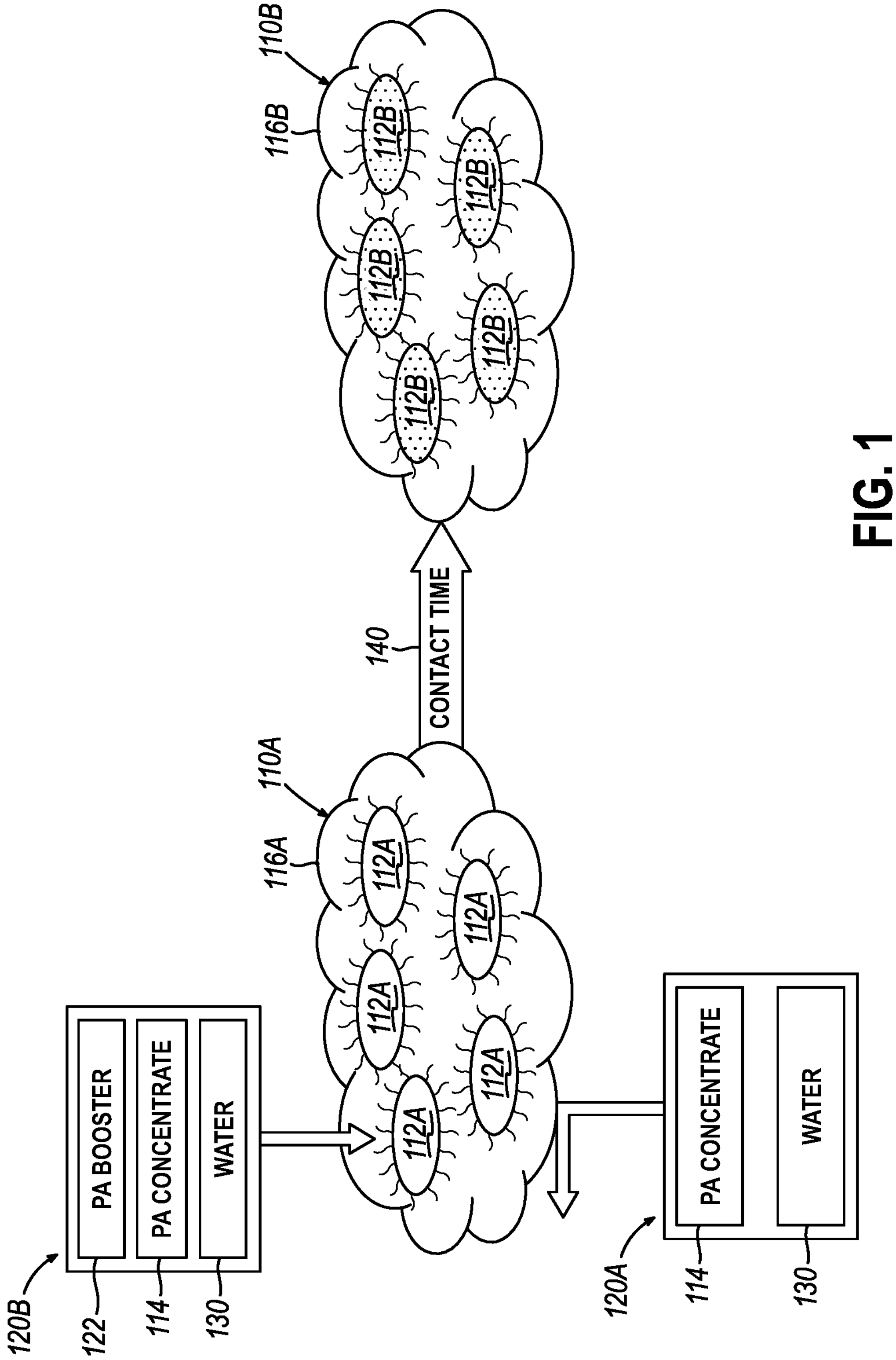
FIG. 1 is a graphical representation of biofilm treatment.

The drawings are not intended to be limiting in any way, and it is contemplated that various embodiments of the invention may be carried out in a variety of other ways, including those not necessarily depicted in the drawings. The accompanying drawings that are incorporated in and form a part of the specification illustrates several aspects of the present invention, and together with the description serves to explain the principles of the invention.

DETAILED DESCRIPTION

The following description of certain examples of the invention should not be used to limit the scope of the present invention. Other examples, features, aspects, embodiments and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive. It is believed that the present invention will be better understood from the following description of certain examples taken in conjunction with the accompanying drawings.

All percentages, parts and ratios as used herein, are by weight of the total composition, unless otherwise specified. All such weights, as they pertain to listed ingredients, are based on the active level and, therefore, do not include solvents or by-products that may be included in commercially available materials, unless otherwise specified.

All references, including patent applications, patent publications and non-patent literature, which are referred to in the present specification are incorporated by reference herein, unless it is expressly indicated that they are not incorporated by reference herein.

Numerical ranges as used herein are intended to include every number and subset of numbers within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9 and so forth.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made. The following description of certain examples of the invention should not be used to limit the scope of the present invention. Other examples, features, aspects, embodiments and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

"About" or "approximately" as used herein, means within an acceptable error range for the particular value as determined by one of ordinary skill in the art, which will depend in part on how the value is measured or determined, e.g., the limitations of the measurement system. For example, "about" can mean within 1, or more than 1 standard deviation, per the practice in the art. Alternatively, "about" can mean a range of up to 15%, or up to 10%, or up to 5%, or up to 1%, or up to 0.5%, of a given value. Where particular values are described in the application and claims, unless otherwise stated the term "about" meaning within an acceptable error range for the particular value should be assumed.

"Biofilm" as used herein, means complex microbial communities characterized by cells attached to surfaces, interfaces, and/or each other, wherein the cells are embedded in a matrix of extracellular polymeric substances ("EPS") of microbial origin.

"CIP application" as used herein, refers to an application of use compositions as described herein, for effectively treating hard surfaces (e.g., equipment and/or systems that handle (e.g., circulate and/or process)) a flowable substance (for example, liquids, emulsions, flowable solids (e.g., solid particulates) and combinations thereof). Such equipment and/or systems may not require complete disassembly in order to treat interior surfaces thereof, which may come into contact with the flowable substance. Exemplary interior surfaces of equipment and/or systems that may come into contact with flowable substances include, but are not limited to, vessels (e.g., tanks), filters, pumps, pipes, hoses, associated fittings and combinations thereof.

"Clear" or "clear to the naked eye" as used herein, means appearing clear to a human having 20/20 vision, without the use of any special imaging equipment.

"Comprising" as used herein, means that the various components, ingredients, or steps, can be conjointly employed in practicing the present invention. Accordingly, the term "comprising" encompasses the more restrictive terms "consisting essentially of" and "consisting of"

"COP application" as used herein, refers to an application of use compositions as described herein, to effectively treat surfaces that can be soaked in the use compositions or to which the use solutions can be readily applied without substantial disassembly of equipment and/or systems. Such surfaces may include those having a single dimension, which may in turn include, but are not limited to, surfaces selected from plates, test coupons, countertops, walls, floors, thresholds and combinations thereof.

"Environmental application" as used herein, refers to an application of use compositions as described herein, to effectively treat exposed surfaces on equipment, floors, countertops, walls, floors, thresholds, drains, etc. For example, environmental application may include treatment of exposed surfaces that come into contact with food and/or beverages such as slicers, conveyors, food processing machines/equipment, etc.

"Disinfectant" as used herein, refers to a substance or a mixture of substances (including solutions) that destroy or irreversibly inactivate bacteria, fungi and viruses, but not necessarily bacterial spores, in on a hard surface.

"Effectively treat" as used herein, means to reduce microbial growth on a surface to which an exemplary use solution has been applied, as compared to the microbial growth on a comparable control surface to which use solution has not been applied. "Effective treatment" of a surface may include successful treatment of a hard surface, wherein the treatment is selected from: cleaning, sterilizing, disinfecting, sanitizing biofilm, killing biofilm, removing biofilm and combinations thereof.

"Foaming" as used herein, refers to a foam profile of at least about 9 inches of foam generation in under 30 seconds and dissipation of the foam in greater than or equal to 5 min, as determined via a foaming evaluation as described hereinbelow.

"Low foaming" as used herein, refers to a foam profile of at least about 5 in. of foam generation in under 10 min. and dissipation of the foam in 2 min. or less, as determined via the foaming evaluation as described hereinbelow.

"No foaming" as used herein, refers to a foam profile of less than or equal to 1 in. of foam generation in under 10 min. and dissipation of the foam in 30 s. or less, as determined via the foaming evaluation as described hereinbelow.

"Low/No foaming" as used herein, encompasses both low foaming and no foaming compositions as described herein.

"PAA disinfectant/sanitizer" as used herein, refers to a composition that contains peracetic acid ("PAA") and that acts as a disinfectant and/or sanitizer. "Disinfecting/sanitizing" refers to the act of disinfecting and/or sanitizing. "Disinfection/sanitization" refers to the characteristic of disinfecting and/or sanitizing.

"Sanitizer" as used herein, means a substance or a mixture of substances (including solutions) that reduce a bacterial population on a hard surface by significant numbers, (e.g., a 3 $\log_{10}$ reduction) or more, but that does not destroy or eliminate all bacteria.

"Sterilant" as used herein, refers to a composition that destroys all viable forms of microbial life on a hard surface.

"Substantially free" with respect to a component, class of components or combinations of components that has or have been specifically identified herein, means no effective amount of that specifically identified component, class of components or combinations of components, or from about 1 wt. % or less, from about 0.1 wt. % or less, or even from about 0.01 wt. % or less, or 0% (i.e., completely free) of the specifically identified component or class of components as specified herein. For example, "substantially free of PA," or "PA free" as used herein, means from about 1 wt. % or less, from about 0.1 wt. % or less, or even from about 0.01 wt. % or less, or 0% (i.e., completely free) of one or more peracids. In a further example, "substantially free of PAA," or "PAA free" as used herein, means from about 1 wt. % or less, from about 0.1 wt. % or less, or even from about 0.01 wt. % or less, or 0% (i.e., completely free) of PAA. In a further example, "substantially free of peroxides" as used herein, means from about 1 wt. % or less, from about 0.1 wt. % or less, or even from about 0.01 wt. % or less, or 0% (i.e., completely free) or peroxides selected from: organic peroxides (including salts of organic peroxides), inorganic peroxides (including salts of inorganic peroxides) and combinations thereof. In a further example, "substantially free of inorganic acids" as used herein, means from about 1 wt. % or less, from about 0.1 wt. % or less, or even from about 0.01 wt. % or less, or 0% (i.e., completely free) of inorganic acids.

"Peracid disinfectant/sanitizer use solution" or "PA disinfectant/sanitizer use solution" as used interchangeably herein, refers to a solution that is ready to be applied to a hard surface (i.e., is "ready to use"). A PA disinfectant/sanitizer use solution may be made prior to application to a hard surface, by diluting a concentrated peracid disinfectant/sanitizer with water and/or premade solutions. PA disinfectant/sanitizer use solutions and concentrated PA disinfectant/sanitizer solutions contain peracids selected from: peroxyacetic acid; peroxyoctanoic acid; peroxysulfonic acid; peroxyformic acid; and combinations thereof. PA disinfectant/sanitizer use solutions include, but are not limited to, peracetic acid use solutions ("PAA disinfectant/sanitizer use solutions"), which may be made prior to application to a hard surface, by diluting a concentrated peracetic acid disinfectant/sanitizer solution with water.

$Log_{10}$ reduction correlates to a 10-fold reduction, i.e., a 1-$log_{10}$=90% reduction. Table 1 shows stepwise $log_{10}$ reductions. The performance standard of $log_{10}$ reduction is commonly measured in terms of colony forming units ("CFUs"). Referencing Table 1, an 8.7-$log_{10}$ inoculum has 501187233.627 CFUs, and a 1-$log_{10}$ reduction of 501,187,233.627 CFUs would result in 50,118,723.3267 CFUs remaining.

TABLE 1

| $Log_{10}$ Reduction | Number of CFUs Remaining | Percent Reduction |
|---|---|---|
| 0 | 501,187,234 | 0% |
| 1 | 50,118,723 | 90% |
| 2 | 5,011,872 | 99% |
| 3 | 501,187 | 99.9% |
| 4 | 50,119 | 99.99% |
| 5 | 5,012 | 99.999% |
| 6 | 501 | 99.9999% |
| 7 | 50 | 99.99999% |
| 8 | 5 | 99.999999% |
| 9 | <1 | 99.9999999% |

When speaking in terms of bacterial, viral and fungal pathogens, $log_{10}$ reduction is important, because microorganisms are numbered in the millions or more due to the rapid doubling time thereof. As demonstrated herein below, the $log_{10}$ reduction of PA disinfectant/sanitizer use solutions comprising concentrated PA disinfectant/sanitizer solutions diluted with water, is significantly increased when instead mixed peracid boosters ("PA boosters") in accordance with the present disclosure are added thereto. For example, based on the MBEC data set forth below, efficacy of PA disinfectant/sanitizer use solutions can be increased by up to about 4 orders of magnitude.

It is believed that know use solutions made from concentrated PA disinfectants/sanitizers may not be effective at killing viruses, fungi and/or spores, much less effective at penetrating, killing and/or removing biofilms. It has surprisingly been found that the efficacy of use solutions comprising concentrated PA disinfectants/sanitizers can be increased or "boosted" by mixing together exemplary PAA boosting compositions as described herein (hereinafter, "PA booster" or "PA boosters") together with PA disinfectants/sanitizers (and optionally, water), to make use solutions that are not only effective at kill viruses, fungi and/or spores that are present on hard surfaces, but that this boosted efficacy is possible, without having to otherwise increase the concentration of PAA that is already present in the resulting use solutions and/or the PA disinfectant/sanitizer concentrates from which they are made. It has further surprisingly found that by mixing together exemplary PA boosters with PA disinfectants/sanitizers, that smaller quantities of the PA disinfectants/sanitizers can be used effectively to treat hard surfaces and/or the amount of PA in the PA disinfectant/sanitizer concentrates reduced, while still providing for use solutions having efficacy against microorganisms that would not otherwise be met. Moreover, the efficacy of PA in PA solutions can be increased by adding exemplary PA boosters thereto, such that the resulting use solutions may not only disinfect and/or sanitize hard surfaces, but can also provide for good biofilm penetration, kill and removal. These and other aspects of the disclosed invention are described herein below.

Referencing FIG. 1, a biofilm (110A), which is located on a hard surface (not shown) comprises live bacteria (112A) surrounded at least in part by an EPS (116A). A PA use solution (120A) made from a PA disinfectant/sanitizer concentrate (114) containing about 800 ppm of PAA and diluted with water (130) is applied to the biofilm (110A) and left there for a contact time of up to 5 minutes. As can be seen in FIG. 1, the PA use solution (120A) does not substantially penetrate the EPS (116A) of the biofilm (110A).

Further referencing FIG. 1, an exemplary PA booster (122) is provided. As can be seen in FIG. 1, the PA booster (122) is mixed with the PA disinfectant/sanitizer concentrate (114) and water (130) to form a second PA use solution (120B) that at least initially contains the same total amount of PA that was originally present in the first PA use solution (120A), and that comprises only the PA disinfectant/sanitizer concentrate (114) and water (130).

The second PA use solution (120B) is applied to the biofilm (110A) and left for a contact time of at least about 5 minutes, which is represented by the arrow (140) in FIG. 1. As can be seen on the right side of the arrow (140) in FIG. 1, the second PA use solution (120B) penetrates the EPS (116B), so that PA in the PA use solution (120B) can reach and kill bacteria (112B) inside of the biofilm (110B) that has been breached.

Thus, referring to FIG. 1, it is believed that even though the same total amount of PAA is at least initially present in both of the PA use solutions (120A, 120B), and even though the concentration of PA is relatively reduced in the second PA use solution (120B) as compared to the first PA use solution (120A), the efficacy of the PA in the second PA use solution (120B) is "boosted" so that it not only effectively penetrate the EPS (116B), but it kills bacteria (112B) inside of the breached biofilm (110B), and the biofilm can then be removed.

Without wishing to be bound by theory, it is believed that the presence of exemplary PA boosters in exemplary use solutions made with concentrated PA disinfectant/sanitizers, allows for penetration of a biofilm that may not otherwise occur as a result from use known use PA disinfectant/sanitizer solutions, particularly without adding significant more PA thereto. It is further believed that the combination of short chain organic acid(s) having at least one pKa of from about 2 to about 7 with exemplary biodispersants in acidic PA boosters has a synergistic effect, such that a PA use solution as described herein, can breach the protective EPS of a biofilm. It is further believed that the breach of the EPS of a biofilm allows PAA and/or and other antimicrobial components that are present in exemplary use solutions cross through the EPS and kill microbes contained therein, as compared to solutions such as those describe in U.S. '789, which are not believed to be capable of penetrating a biofilm as exemplary PA use solutions described herein may do, particularly not within a contact time of 5 minutes or less.

Accordingly, exemplary PA boosters provide what is believed to be heretofore undiscovered synergies with existing PAA disinfectants/sanitizers such that they can also be used as a sterilant and/or used to kill and remove biofilms, without undesirably adding more PA thereto.

As described above and demonstrated herein, the efficacy of the PA (e.g., PAA) in PA disinfectants/sanitizers is surprisingly increased or "boosted" by exemplary PA boosters, without having to otherwise add more PA to the PA use solutions. Moreover, PA (e.g., PAA) efficacy in PAA disinfectant/sanitizer use solutions is boosted such that the contact time of the PA use solutions is comparatively reduced as compared to the PA disinfectant/sanitizer concentrates alone or diluted with water. Surprisingly these advantages may be obtained even though when mixed with an exemplary PA booster, the concentration of PA in the resulting PA use solutions is actually reduced. Accordingly, the combination of exemplary PA boosters with PA disinfectant/sanitizer concentrates increases the killing capabilities of a PA use solution, yet avoids the aforementioned undesirable consequences of attempting to boost PA efficacy by adding yet more PA to a PA solution. Exemplary PA boosters, including both foaming and non-foaming boosters, may boost efficacy of PA disinfectant/sanitizer concentrates and/or use solutions comprising them by from about 2 $\log_{10}$ to about 5 $\log_{10}$ cycles, from about 2.5 $\log_{10}$ to about 4.5 $\log_{10}$ cycles, from about 3 $\log_{10}$ to about 4 $\log_{10}$ cycles, without adding more PA thereto.

These and other features of exemplary PA boosters, kits containing them and methods of using them are disclosed hereinbelow.

Exemplary PA Boosters

Exemplary PA boosters comprise a combination of components selected from the following: (A) Organic Acids; (B) Biodispersants; (C) Chelants: (D) pH Buffering Agents; (E) Foaming Agents; (F) Defoaming Agents; (G) Coupling Agents; and combinations thereof.

A) Organic Acids

Exemplary PA boosters have an acidic pH and contain a combination of acids, including a primary organic acid and an ancillary organic acid that is different from the primary organic acid. In exemplary PA boosters, the main purpose of the primary organic acid is to act as an antimicrobial agent.

Exemplary primary organic acids can have secondary properties that can provide exemplary PA boosters with additional desired characteristics, including but not limited to, an acidic pH. Primary organic acids of use in exemplary PA boosters may be selected from: glycolic acid; benzoic acid; fumaric acid; caprylic acid; lactic acid; proprionic acid; and combinations thereof.

Exemplary foaming PA boosters comprise from about 0.1% to about 30%, from about 0.5% to about 20%, from about 1.0% to about 15% of one or more primary organic acids. Exemplary low/no foaming PA boosters comprise from about 1.0% to about 15%, from about 5.0% to about 13.0%, or from about 7% to about 10%, of one or more primary organic acids.

In addition to containing one or more primary organic acid(s), exemplary PA boosters further comprise an ancillary organic acid that is different from the primary organic acid. In exemplary PA boosters, the primary purpose of an ancillary organic acid is to act as an acidifying agent of the PA boosters. Some exemplary ancillary organic acids may further aid a PA use solution in breaching an EPS of a biofilm, be antimicrobial and combinations thereof.

Ancillary organic acids of use have a carbon chain length of C6 or less and at least one pKa of from about 2 to about 7. Ancillary organic acids of use may be selected from: acetic acid; formic acid; maleic acid; tartaric acid; and combinations thereof.

Exemplary foaming PA boosters comprise from about 0.1% to about 20%, from about 0.5 to about 18%, from about 1.0% to about 15%, or from about 5.0% to about 10% of one or more ancillary organic acids. Exemplary low/no foaming PA boosters comprise from about 0.5% to about 30%, from about 2.0% to about 20%, or from about 7% to about 10% of one or more ancillary organic acids.

(B) Biodispersants

Exemplary PA boosters comprise one or more biodispersants. Without wishing to be bound by theory, it is believed that when a PA use solution is made with an exemplary PA booster as described herein, biodispersant(s) contained therein aid in the breach of an EPS layer of a biofilm to which the PA use solution has been applied. It is further believed that the breach of the EPS layer of a biofilm allows for any antimicrobial agents contained in the PA use solution, to penetrate the EPS layer, enter into the biofilm and kill bacteria contained therein. It is further believed that biodispersants aid in the removal of treated biofilm from hard surfaces. Exemplary biodispersants of use may be selected from: alkyl sulfosuccinate; alkyl sulfoacetate; alkylamide hydrolysate; and combinations thereof Exemplary foaming PA boosters comprise from about 0.1% to about 10%, from about 0.5% to about 8%, from about 1.0% to about 7%, or from about 4.0% to about 6.0% of one or more biodispersants. Exemplary low/no foaming PA boosters comprise from about 1.0% to about 10%, from about 1.0% to about 7%, or from about 3% to about 4% of one or more biodispersants.

(C) Chelants

Exemplary PA boosters may contain one or more chelants. Without wishing to be bound by theory, it is believed that when a PA use solution is made with an exemplary PA booster as described herein, chelant(s) contained therein aid in the breach of an EPS layer of a biofilm to which the PA use solution has been applied by sequestering extracellular metals within the biofilm and thereby destabilizing biofilm cells.

Chelants of use in exemplary PA boosters may be chosen by one of ordinary skill in the art based upon the teachings herein. Exemplary chelants of use may be selected from: citric acid; 1-hydroxyethylidene 1,1-diphosphonic acid ("HEDP"); trisodium salt of methylglycinediacetic acid (for example, Trilon® M Liquid from BASF (Florham Park, NJ)); L-glutamic acid N,N-diacetic acid, tetrasodium salt (i.e., tetrasodium salt of GLDA; e.g., Biopure™ GLDA from Jarchem Innovative Ingredients LLC (Newark, NJ); hydroxyethylene-diaminetriacetic acid; trisodium salt (i.e., trisodium HEDTA; e.g. Dissolvene Na3 from Nouryon (Chicago, IL); salts of ethylenediamine tetracetic acid ("EDTA"). Exemplary salts of EDTA of use may be selected from: tetrasodium salt of EDTA (e.g., Versene™ 100 from The Dow Chemical Company (Torrance, CA)); and combinations thereof.

Exemplary foaming PA boosters comprise from about 0.3% to about 20%, from about 0.5% to about 17%, from about 5.0% to about 18%, from about 8.0% to about 15%, or from about 9.0% to about 11%, of one or more chelants. Exemplary low/no foaming PA boosters comprise from about 2.0% to about 20%, from about 6.0% to about 18%, or from about 9.0% to about 17% of one or more chelants.

(D) pH Buffering Agents

Exemplary PA Boosters have a pH of from about 3 to about 4, or from about 3.5 to about 4. To maintain their pH during storage, exemplary PA boosters may contain one or more buffering agents. Exemplary pH buffering agents of use may also help to maintain the pH of use solutions comprising exemplary PA boosters, concentrated PA disinfectants/sanitizers and water, such that the use solution has a pH of from about 1 to about 5.

Exemplary pH buffering agents may be chosen by one of ordinary skill in the art based upon the teachings herein. Exemplary pH buffering agents of use may be selected from: acetates; malates; fumarates; oxalates; and combinations thereof. For example, pH buffering agents may be selected from: sodium acetate; sodium malate; sodium fumarate; sodium oxalate; and combinations thereof.

Exemplary foaming PA boosters and exemplary low/no foaming PA boosters may comprise from about 0.1% to about 5%, from about 0.15% to about 4%, from about 1% to about 3%, or from about 1.5% to about 2%, of one or more buffering agents.

(E) Foaming Agents

Exemplary foaming PA boosters may contain one or more foaming agents. Without wishing to be bound by theory, it is believed that the foaming agents stabilize the bubble structure and/or matrix of compositions and/or to prevent dissipation thereof after application to a hard surface.

Foaming agents of use in exemplary PA boosters may be chosen by one of ordinary skill in the art based upon the teachings herein. Exemplary foaming agents of use may be selected from: ethoxylated alcohols; amine oxides; sulfonic acids; and combinations thereof. For example, foaming agents may be selected from: alcohol ethoxylate (C9-C11); myristyl amine oxide; cocoamine oxide; linear alkylbenzene sulfonate (e.g., DDBSA); and combinations thereof.

Exemplary foaming PA boosters may comprise from about 0.1% to about 15%, from about 0.7% to about 12%, or from about 1% to about 8%, or from about 2% to about 4%, of one or more foaming agents.

(F) Defoaming Agent

Exemplary low/no foaming PA boosters may contain one or more defoaming agents (i.e., "defoamers"). Without wishing to be bound by theory, it is believed that the defoaming agents act to destabilize bubble structure and/or the bubble matrix so that the composition does not substantially foam, and if so, it dissipates quickly, when applied to a hard surface.

Defoaming agents of use in exemplary low/no foaming PA boosters may be chosen by one of ordinary skill in the art based upon the teachings herein. An exemplary defoaming agents of use include polyoxypropylene-polyethylene block copolymers, such as those available in the Pluronic® L series from BASF (Florham Park, NJ).

Exemplary low/no foaming PA boosters may comprise from about 4% to about 15%, from about 5% to about 9%, or from about 6% to about 8% of one or more defoaming agents.

(G) Coupling Agents

Exemplary low/no foaming PA boosters may contain one or more coupling agents. Without wishing to be bound by theory, it is believed that the coupling agents act to dissolve components in exemplary PAA boosters that would not otherwise dissolve therein.

Coupling agents of use in exemplary low/no foaming PA boosters may be chosen by one of ordinary skill in the art based upon the teachings herein. An exemplary coupling agent of use includes iminodipropate alanate, which is available as Amphoteric 400 from Evonik (Essen, Germany).

Exemplary low/no foaming PA boosters may comprise from about 4% to about 15%, from about 5% to about 9%, or from about 6% to about 8% of one or more defoaming agents.

Preparation of Boosted PA Disinfectant/Sanitizer Use Solutions

As demonstrated herein below, the $\log_{10}$ reduction of PA disinfectant/sanitizer use solutions comprising concentrated PA disinfectant/sanitizer solutions diluted with water, is significantly increased when instead diluted with exemplary PA boosters and water. For example, an exemplary PA booster may be added to a concentrated PA disinfectant/sanitizer and the resulting mixture may be diluted with water to form the PA disinfectant/sanitizer use solution; Formula I below shows how such a dilution may be set forth:

Xoz:Yoz:Zoz=concentrated PA disinfectant/sanitizer: PA booster:diluent

For example, a foaming PAA disinfectant/sanitizer use solution may comprise: 2 oz concentrated PAA disinfectant/sanitizer (containing between 5% and 6% of active PAA): 12.8 oz of Foaming PAA Booster:113.2 oz of water.

In a further example, a low/no foaming PAA disinfectant/sanitizer use solution is made by blending together: 2.5 oz concentrated PAA disinfectant/sanitizer (containing between 5% and 6% of active PAA):0.5 oz of low/no foam PAA booster:125.0 oz of water.

To calculate the amount of ppm of PAA in the resulting foaming and low/no foaming disinfectant/sanitizer use solutions, the following Formula II may be used:

$$ppm\ PAA = \left(\frac{\text{oz of } PAA \text{ concentrate} \times \%\text{ active } PAA \text{ in concentrate}}{\text{Total oz}}\right) \times 10000$$

Using formula II, if a concentrated PAA disinfectant/sanitizer containing 5% active PAA is combined with an exemplary foaming or low/no foaming PA booster and diluent as described above, the total amount of PAA in the respective foaming or low/no foaming PAA disinfectant/sanitizer use solution would contain 781.25 ppm of active PAA.

To calculate the amount of ppm of active organic acid in use solution, the following Formula III may be used:

$$ppm\ \text{Organic Acid} = \left(\frac{\text{oz of Booster product} \times \%\text{ active Organic Acid in Booster Product}}{\text{Total oz}}\right) \times 10000$$

For example, if a foaming PA booster containing 1% of an active organic acid was used, the total ppm of the active organic acid in the use solution is equal to 1,000 ppm of active organic acid.

Kits

Exemplary PA boosters may be packaged and sold together with a concentrated PA disinfectant/sanitizer. In exemplary kits, the PA booster is packaged in a first container (e.g., a first bottle) and the concentrated PA disinfectant/sanitizer is packaged in a second container (e.g., a second bottle). Exemplary concentrated PA disinfectants/sanitizers may contain a PA selected from: peroxyacetic acid; peroxyoctanoic acid; peroxysulfonic acid; peroxyformic acid; and combinations thereof. Exemplary concentrated PA disinfectants/sanitizers may contain a total of from about 2% to about 15%, from about 3% to about 10%, or from about 4% to about 6% of one or more peracids. Exemplary concentrated PA disinfectants/sanitizers may have a pH of from about 1 to about 5, or from about 1 to about 4.

Method of Use

An exemplary method of boosting efficacy of a PA disinfectant/sanitizer use solution comprises the following steps. A concentrated PA disinfectant/sanitizer is diluted with either a foaming PA booster or a low/no foaming PA booster and water.

For example, a concentrated PA disinfectant/sanitizer comprising one or more peracetic acids at from about 2% to about 15% by weight is diluted with water to produce a first use solution. The first use solution has: (a) a pH of from about 1 to about 5; (b) less than or equal to about 800 ppm total peroxygen species; and (c) is characterized by an efficacy of equal to or less than a 5 $\log_{10}$ reduction of a *Pseudomonas aeruginosa* biofilm after contact therewith for 10 minutes or more pursuant to ASTM E2871-12 (approved Apr. 1, 2012 & published in June of 2012).

The same concentrated PA disinfectant/sanitizer is instead diluted as follows:

A foaming PAA disinfectant/sanitizer use solution is made by blending together: 2 oz concentrated PAA disinfectant/sanitizer (containing between 5% and 6% of active PAA): 12.8 oz of Foaming PAA Booster:113.2 oz of water. A low/no foaming PAA disinfectant/sanitizer use solution is made by blending together: 2.5 oz concentrated PAA disinfectant/sanitizer (containing between 5% and 6% of active PAA):0.5 oz of low/no foam PAA booster:125.0 oz of water. The second use solution: (a) has a pH of from about 1 to about 5; and (b) is characterized by a boosted efficacy equal to or greater than 6 $\log_{10}$ reduction of *Pseudomonas aeruginosa* biofilm after contact therewith for 10 minutes or more pursuant to ASTM E2871-12 (approved Apr. 1, 2012 & published in June of 2012).

Examples and Data

Exemplary foaming PA boosters A through O are set forth in Table 2, and exemplary low/no foaming PA boosters I through XIV are set forth in Table 3 below. It is to be noted that the weight percentages of components set forth in Tables 2 and 3 are active weight percentages.

TABLE 2

| | | A | B | C | D | E | F | G | H | I | J | K | L | M | N | O |
|---|---|---|---|---|---|---|---|---|---|---|---|---|---|---|---|---|
| Ancillary Acid | acetic acid | 0.5 | 5 | | | 5 | 10 | 15 | 20 | 5 | 0.5 | 0.5 | 0.5 | 0.5 | 0.5 | 0.5 |
| | formic acid | | | | | 1 | | | | 1 | | | | | | |
| | maleic acid | | | 7.5 | | | | | | | | | | | | |
| | tartaric acid | | | | 5 | | | | | | | | | | | |
| Primary Acid | glycolic acid | 0.6 | 5 | 20 | 7.5 | 15 | 5 | 10 | 0.6 | 0.6 | 4 | 5 | 3 | 5 | 5 | |
| | benzoic acid | | | | | | | | | | 10 | | | | | |
| | fumaric acid | | | | | | | | | | | 5 | | | | |
| | caprylic acid | | | | | | | | | | | | 5 | | | |
| | lactic acid | | | | | | | | | | | | | S | | 0.6 |
| | proprionic acid | | | | | | | | | | | | | | 2 | |
| Bio-dispersant | sodium dioctyl sulfosuccinate | 0.4 | 4 | 5 | | 4 | 1 | 10 | | | 4 | 4 | 4 | | 6 | 0.4 |
| | disodium lauryl sulfosuccinate | | | | 4 | | | | 3 | | | | | | | |
| | sodium lauryl sulfoacetate | | | | | | | | | 5 | | | | 6 | | |
| Chelant: | citric acid | 0.4 | 4 | 4 | | | 8 | 5 | | | 4 | 4 | 4 | 4 | 5 | 0.4 |
| | 1-hydroxyethylidene 1,1-diphosphonic acid | 0.3 | 6 | 8 | | 5 | 10 | 9 | 3 | 4 | 6 | 5 | 8 | 10 | 0.3 | 0.3 |
| | methylglycinediacetic acid | | | | | | | 0.75 | | | | | | | | |
| | L-glutamic acid N,N-diacetic acid, tetrasodium salt (i.e., tetrasodium salt of GLDA) | | | | | | 0.5 | | | | | | | | | |
| | hydroxyethylene-diaminetriacetic acid | | | | | | | | 8 | | | | | | | |
| | trisodium salt (i.e., trisodium HEDTA) | | | | | | | | | 5 | | | | | | |
| | salts of ethylenediamine tetracetic acid including, but not limited to, sodium salts of EDTA (e.g., tetrasodium salt of EDTA) | | | | | | | | | | | | | | | |
| | ethylenediamine tetracetic acid | | | | | 3 | | | | | | | | | | |
| Foaming Agent | alcohol ethoxylate (C9-C11) | 0.3 | 3 | | | 0.3 | 0.3 | | 3 | 1 | 2 | 8 | 3 | 4 | 3 | 0.3 |
| | myristyl amine oxide | | | | | | | | | | | | | | | |
| | Cocoamine oxide | | | 5 | | | | | | | | | | | | |
| | DDBSA (Linear Alkylbenzene sulfonate) | 0.4 | 4 | 8 | | 0.4 | 0.4 | 6 | 5 | 6 | 3 | 4 | 4 | 4 | 4 | 0.4 |
| pH Buffering Agent: | sodium acetate | 0.15 | 1.5 | | 3 | | 3 | 4 | 3 | 2 | 3 | 1 | 2 | 4 | 2 | 0.15 |
| | Sodium Malate | | | 4 | | | | | | | | | | | | |
| | Sodium Fumarate | | | | | 4 | 0.5 | | | | | | | | | |
| | Sodium Oxalate | | | | | | | | | | | | | | | |
| | QS with Water to: | 100 | 100 | 100 | 100 | 100 | 100 | 100 | 100 | 100 | 100 | 100 | 100 | 100 | 100 | 100 |

TABLE 3

| | | I | II | III | IV | V | VI | VII | VIII | IX | X | XI | XII | XIII | XIV |
|---|---|---|---|---|---|---|---|---|---|---|---|---|---|---|---|
| Ancillary Acid | acetic acid | 2.5 | 2.5 | 2.5 | 2.5 | | 7.5 | 8 | 10 | 5 | 2.5 | 5 | 10 | 20 | 30 |
| | formic acid | | | | | | | | | 3 | | 3 | | | |
| | maleic acid | | | | | | | | | | 5 | | | | |
| | tartaric acid | | | | | | | | | | | | 3 | | |
| Primary Acid | glycolic acid | 10 | 10 | 10 | 10 | 10 | 10 | 10 | 10 | 10 | 10 | 15 | 10 | 10 | 12.5 |
| | benzoic acid | | | | | 10 | | | | | | | | | |
| | fumaric acid | | | | | | 10 | | | | | | | | |
| | caprylic acid | | | | | | | 10 | | | | | | | |
| | lactic acid | | | | | | | | 12 | | | | | | |
| | proprionic acid | | | | | | | | | 10 | | | | | |
| Biodispersant | sodium dioctyl sulfosuccinate | 3 | 3 | 3 | 3 | 4 | | | 4 | | | 6 | 3 | 10 | 4 |
| | disodium lauryl sulfosuccinate | | | | | | 3 | | | 4 | | | | | |
| | sodium lauryl sulfoacetate | | | | | | | 3 | | | 4 | | | | |
| Chelant | citric acid | 4 | 4 | 4 | 4 | 10 | 4 | 4 | 4 | 4 | | | | | 4 |
| | 1-hydroxyethylidene 1,1-diphosphonic acid | 2.4 | 2.4 | 2.4 | 2.4 | 10 | 5 | 4 | 6 | 6 | 9 | 9 | 2.4 | 2.4 | 6 |
| | methylglycinediacetic acid | | | | | | | | | | 8 | | | | |
| | L-glutamic acid N,N-diacetic acid, tetrasodium salt (i.e., tetrasodium salt of GLDA) | | | | | | | | | | | 4 | | | |
| | hydroxyethylene-diaminetriacetic acid trisodium salt (i.e., trisodium HEDTA) | | | | | | | | | | | | 3 | | |
| | salts of ethylenediamine tetracetic acid including, but not limited to, sodium salts of EDTA (e.g., tetrasodium salt of EDTA) | | | | | | | | | | | | | | |
| | ethylenediamine tetracetic acid | | | | | | | | | | | | | 4 | |
| Coupling agent | iminodipropate alanate | 3.6 | 2 | 3 | 4 | 3.6 | 5 | 3.6 | 3.6 | 3.6 | 3.6 | 3.6 | 3.6 | 10 | 8 |
| Defoamer | polyoxypropylene-polyethylene block copolymer | 8 | 10 | 8 | 10 | 15 | 6 | 7 | 9 | 8 | 8 | 8 | 8 | 8 | 10 |
| pH Buffering Agent: | Sodium acetate | 1.5 | 1.5 | 1.5 | 1.5 | 5 | 1.5 | 3 | 1.5 | 5 | 2 | 3 | 3 | 3 | 5 |
| | Sodium Malate | | | | | | | | | | | | | | |
| | Sodium Fumarate | | | | | | | | | | | | | | |
| | Sodium Oxalate | | | | | | | | | | | | | | |
| | QS with Water to: | 100 | 100 | 100 | 100 | 100 | 100 | 100 | 100 | 100 | 100 | 100 | 100 | 100 | 100 |

Figure 2:
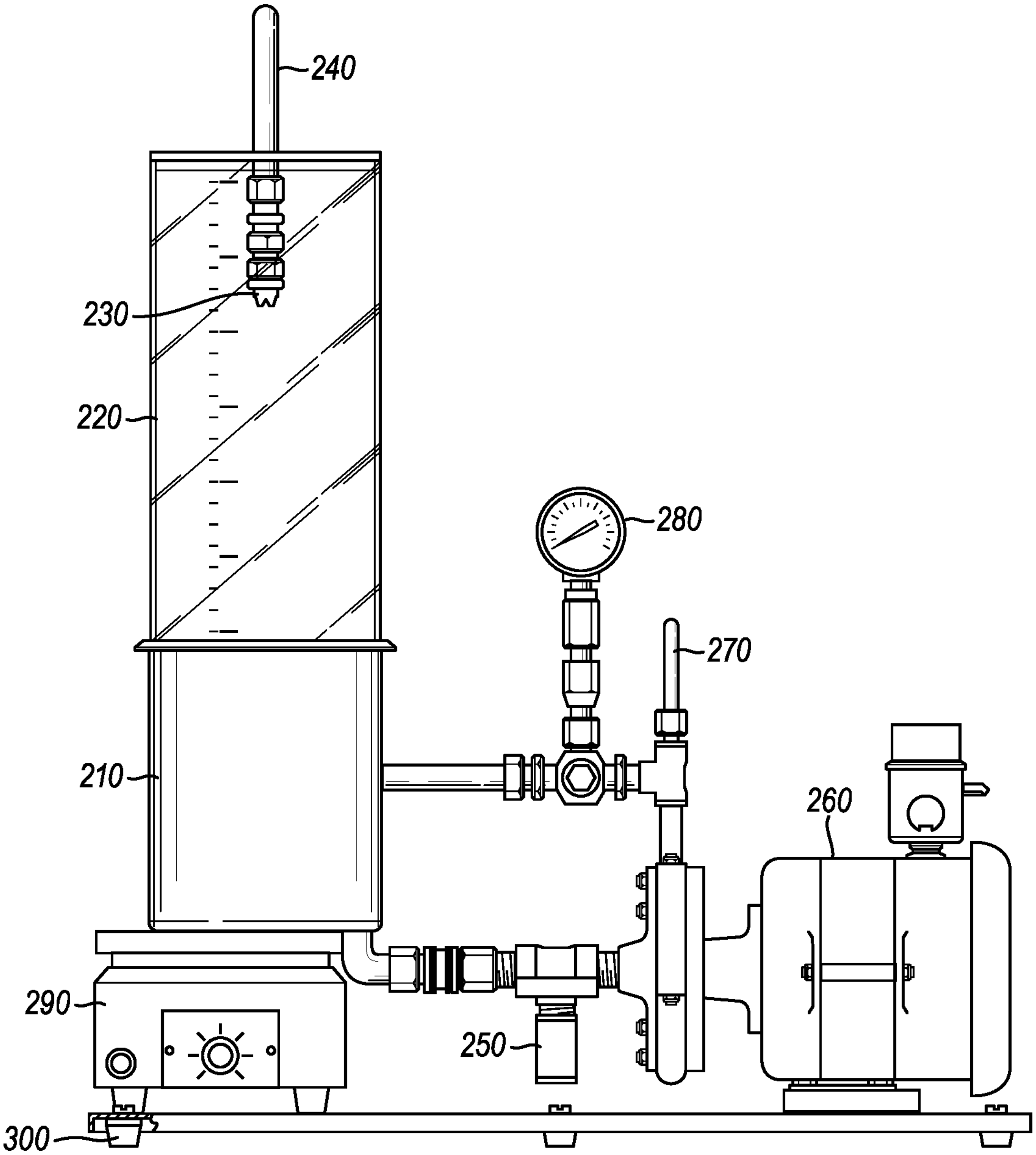
FIGS. 2 and 3 are graphical representations of a recirculating liquid foam tester (RALF).
Figure 3:
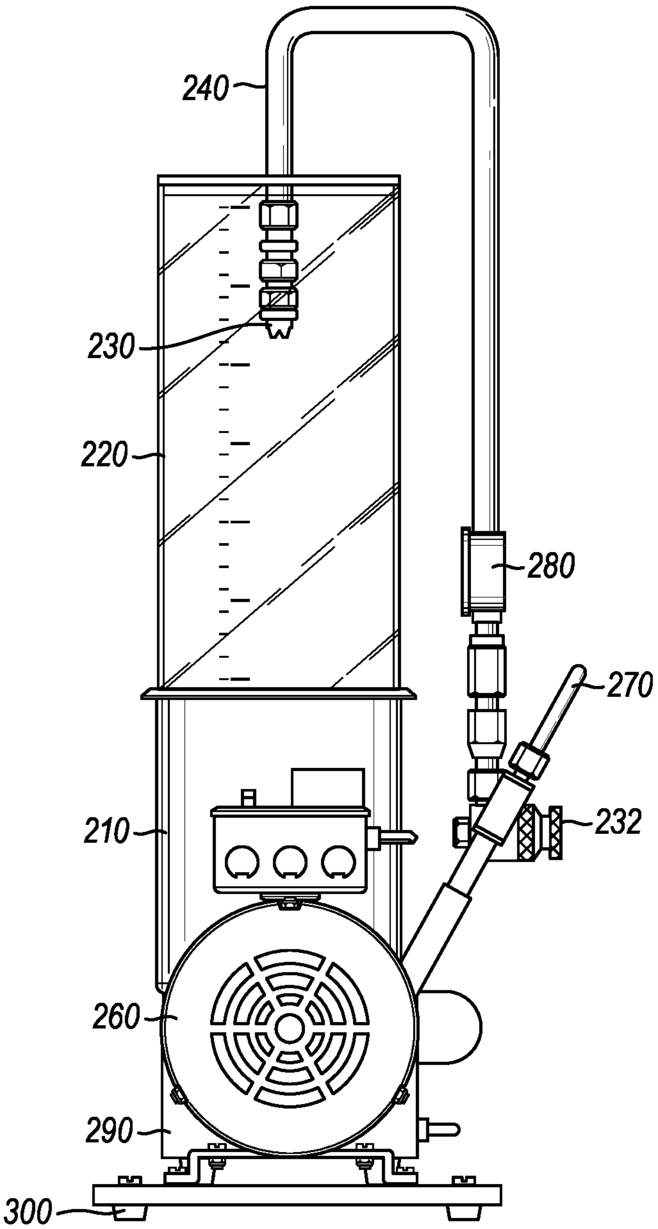

Foaming characteristics of exemplary PA boosters and/or PA use solutions comprising them are determined using a recirculating foam tester ("RALF"), which is shown in FIGS. 2 and 3. A RALF (200) comprises the following components: a stainless steel beaker that is 6 inches in diameter by 6 inches tall (210); a polycarbonate cylinder having height markings that is 6 inches in diameter by 18 inches tall (220) that is sealed to the stainless steel beaker (210); a VeeJet® low pressure 20 degree tapered-edge, wide tip spray nozzle (230) from Spraying Systems Co.® that is connected to a screw valve (232) to regulate flow and pressure through the valve; ⅜ inch stainless steel piping comprising feed and return lines (240) that draws solution from the bottom of the stainless steel beaker (210) and sprays the solution back into the beaker through the spray nozzle (230); a gate valve to drain system (250); a ⅕ horsepower electric recirculating pump (260); a thermometer or thermocouple port (270); a pressure gauge (280); a hot plate (290); a stainless steel base with isolator feet (300).

Using a RALF, foaming characteristics of a solution are determined as follows. 3.0 L of DI water is placed inside of the stainless steel beaker (tap water or hard water may be used depending on test parameters). Turn on the recirculating pump to recirculate the water until the desired testing temperature is reached (temperature is measured using a thermometer inserted into the thermometer/thermocouple port. If testing at room temperature, leave the hot plate off, otherwise, heat the water to from about 35° C.-60° C. Once the water reaches the desired temperature, dose in the correct amount of test solution. Operate the RALF at a pressure of 40 psi and a flow rate 2 gallons/minute for 10 minutes, allowing any foam to build. During testing, record the foam height of the test solution at various times. If foam height is uneven, take the average of the high side of the foam and the low side of the foam. Turn the RALF off to stop the flow. Record the time it takes for the foam to break to a height of 0 inches.

Foaming characteristics of foaming PA booster example A and no/low foaming PA boosters in accordance with examples I through IV are measured and set forth in Table 4 below:

TABLE 4

| Time (min) | Temp (° C.) | Height (in) | Dissipation Time (min) |
|---|---|---|---|
| Example A | | | |
| 0.25 | 20 | 18 | 120 |
| 0.25 | 20 | 18 | 140 |
| 0.25 | 20 | 18 | 120 |
| Example I | | | |
| 1 | 35 | 1 | 0.15 |
| 5 | 35 | 2 | 0.5 |
| 10 | 35 | 4 | 0.75 |
| Example II | | | |
| 1 | 35 | 1.5 | 0.25 |
| 5 | 35 | 2.5 | 0.8 |
| 10 | 35 | 4.5 | 1.15 |

TABLE 4-continued

| Time (min) | Temp (° C.) | Height (in) | Dissipation Time (min) |
|---|---|---|---|
| Example III | | | |
| 1 | 35 | 0.5 | 0.2 |
| 5 | 35 | 1.25 | 1 |
| 10 | 35 | 4 | 2.25 |
| Example IV | | | |
| 1 | 35 | 0.5 | 0.3 |
| 5 | 35 | 1.25 | 1 |
| 10 | 35 | 3.5 | 1.5 |

Referencing Table 5, boosting efficacy of an exemplary foaming PA booster in accordance with Example A is assessed using the "Standard Test Method for Testing Disinfectant Efficacy against *Pseudomonas aeruginosa* Biofilm using the MBEC Assay" (ASTM E2799-17 (approved Apr. 1, 2017 & published in May of 2017); hereinafter, "MBEC"). Proxitane® EQ Peracetic Acid from Solvay Chemicals, Inc. (Houston, TX) is chosen as an exemplary commercially available PAA to be mixed with the exemplary PA boosters in accordance with the present disclosure. Proxitane® EQ Peracetic Acid is an EPA registered liquid product that is marketed for circulation cleaning and institutional/industrial sanitizing of pre-cleaned, hard, non-porous food contact surfaces and equipment such as tanks, pipelines, evaporators, fillers, pasteurizer and aseptic equipment. According to its MSDS, Proxitane® EQ Peracetic Acid contains: 5-5.4 wt % of peracetic acid; 20-24 wt % of hydrogen peroxide; 10-12 wt % of acetic acid; and the balance is water.

TABLE 5

Reduction of *P. aeurginosa* biofilm (log CFU) upon exposure to PAA in the absence or presence of Booster

| PAA (ppm) | Booster Presence[1] None | Low/No Foam (Example I) | High Foam (Example A) |
|---|---|---|---|
| 0 | NA[2] | 2.66 | 5.37 |
| 10 | NR[3] | ND[4] | 3.19 |
| 25 | NR | 4.70 | ND |
| 50 | NR | >7.66 | >7.66 |
| 100 | 2.66 | >7.66 | >7.66 |
| 200 | 5.52 | >7.66 | >7.66 |
| 300 | 4.01 | >7.66 | >7.66 |
| 400 | 2.66 | >7.66 | >7.66 |

[1]At 0.5 oz/gal low/no foam Booster or 12.8 oz/gal high foam Booster.
[2]Not applicable. Initial cell density was 8.66 log CFU.
[3]No reduction.
[4]Not determined.

As can be seen from the MBEC data set forth in Table 5, a PA use solution comprising Proxitane® EQ Peracetic Acid diluted with water results in an efficacy characterized by a log 10 reduction of 2.66 or 5.52, even when the PAA concentration in the PA use solution is as high as 400 ppm. In contrast, when a PA use solution comprising an exemplary foaming booster, Proxitane® EQ Peracetic Acid and water is tested, an efficacy characterized by a log 10 reduction of 7.7 is achieved, even when the PAA concentration in the PA use solution is as low as 50 ppm. Thus, it can be concluded that with respect to Proxitane® EQ Peracetic Acid, an exemplary PA booster "boosts" the efficacy of Proxitane® EQ Peracetic Acid from about 4 to about 5 log 10 cycles without the addition of more PAA to the use solutions.

Referencing Table 6, boosting efficacy of an exemplary foaming PA booster in accordance with Example A may be further assessed using the "Standard Test Method for Testing Disinfectant Efficacy against *Pseudomonas aeruginosa* Biofilm using the MBEC Assay" (ASTM E2871-19 (approved Jan. 1, 2019 & published in February of 2019). Proxitane® EQ Peracetic Acid from Solvay Chemicals, Inc. (Houston, TX) is once again chosen as an exemplary commercially available PAA to be mixed with the exemplary PA boosters in accordance with the present disclosure.

TABLE 6

Reduction of *P. aeurginosa* biofilm (log CFU) upon exposure to PAA in the absence or presence of Booster by ASTM E2871-19

| | | Booster Presence[2] | | Efficacy Increase[3] | |
|---|---|---|---|---|---|
| Test | PAA[1] Initial Efficacy | PAA[1] + Low/No Foam (Example I) | PAA[1] + High Foam (Ex. A) | PAA[1] + Low/No Foam (Ex. I) | PAA[1] + High Foam (Ex. A) |
| 1 | 2.99 | 7.98 | 8.26 | 4.99 | 5.27 |
| 2 | 3.10 | 6.39 | 7.60 | 3.29 | 4.50 |
| 3 | 3.00 | 6.20 | 7.48 | 3.20 | 4.48 |
| 4 | 3.97 | 8.24 | 8.21 | 4.27 | 4.24 |

[1]PAA concentration 800 ppm
[2]At 0.5 oz/gal low/no foamBooster or 12.8 oz/gal high foam Booster.
[3]Log CFU As can be seen in Table 6, a PA use solution comprising Proxitane® EQ Peracetic Acid and water, in which PAA is present at a concentration of 800 ppm, is characterized by an average efficacy of a 3.27 $\log_{10}$ reduction of *Pseudomonas aeruginosa* biofilm after contact therewith for 10 minutes or more pursuant to ASTM E2871-19. Moreover, a PA use solution comprising an exemplary no/low foaming PA Booster in addition to Proxitane® EQ Peracetic Acid and water, is characterized by an average efficacy of a 3.97 $\log_{10}$ reduction of *Pseudomonas aeruginosa* in the biofilm after contact therewith for 10 minutes or more pursuant to ASTM E2871-19. Moreover, a PA use solution comprising an exemplary foaming PA Booster in addition to Proxitane® EQ Peracetic Acid and water, is characterized by an average efficacy of a 4.6 $\log_{10}$ reduction of *Pseudomonas aeruginosa* biofilm after contact therewith for 10 minutes or more pursuant to ASTM E2871-19. Thus, it can be concluded that exemplary PA boosters "boost" the efficacy of Proxitane® EQ Peracetic Acid from about 2 to 5 $\log_{10}$ cycles without the addition of more PAA to the use solutions.

Efficacy against biofilm bacteria of a PA use solution comprising a peracid other than PAA, both with and without exemplary foaming and no/low foaming PA boosters, may be similarly tested via MBEC. Referencing Table 7, expected data relating to the reduction of *P. aeruginosa* biofilm (log 10 CFU) in the presence or the absence of the exemplary PA boosters is set forth.

TABLE 7

MBEC Test Results of *P. aeurginosa* biofilm (log CFU) upon exposure to PA in the absence or presence of Booster

| Total PA (ppm) | Booster Presence[1] None | Low/No Foam (Example I) | Foaming (Example A) |
|---|---|---|---|
| 0 | NA[2] | FAIL | FAIL |
| 10 | FAIL | FAIL | FAIL |
| 25 | FAIL | FAIL | FAIL |

TABLE 7-continued

MBEC Test Results of *P. aeurginosa* biofilm (log CFU) upon exposure to PA in the absence or presence of Booster

| | Booster Presence[1] | | |
|---|---|---|---|
| Total PA (ppm) | None | Low/No Foam (Example I) | Foaming (Example A) |
| 50 | FAIL | PASS | PASS |
| 100 | FAIL | PASS | PASS |
| 200 | FAIL | PASS | PASS |
| 300 | FAIL | PASS | PASS |
| 400 | FAIL | PASS | PASS |

[1]At 0.5 oz/gal low/no foam Booster or 12.8 oz/gal high foam Booster.
[2]Not applicable.

As can be seen in Table 7, it is expected that PAA alternatives (e.g., peroxyoctanoic acid, etc.) may behave similarly to PAA in their response to the MBEC testing and the efficacy boost provided by exemplary foaming and no/low foaming PA boosters.

Any impact of the primary acid that is present in exemplary PA boosters may be assessed via MBEC. Referencing Table 8, data relating to the reduction of *P. aeruginosa* biofilm (log 10 CFU) in the presence exemplary PAA boosters containing glycolic acid per Example A, or containing lactic acid per Example O, are set forth.

TABLE 8

Reduction of *P. aeurginosa* biofilm ($log_{10}$ CFU) upon exposure to PAA in the absence or presence of High Foam Booster[1] based on Glycolic or Lactic Acids

| | Booster | | |
|---|---|---|---|
| PAA (ppm) | None | Glycolic acid (Example A) | Lactic acid (Example O) |
| 0 | NA[2] | 4.79 | 5.92 |
| 10 | 1.33 | 3.19 | 5.28 |
| 25 | 1.33 | 4.70 | 4.77 |
| 50 | 1.33 | 5.90 | >6.33 |
| 100 | 1.42 | >6.33 | >6.33 |
| 200 | 2.16 | >6.33 | >6.33 |

[1]At 12.8 oz/gal Booster.
[2]Not applicable. Initial cell density was 7.33 $log_{10}$ CFU.

As can be seen in Table 8, when exemplary PA boosters are added to the PA use solutions, regardless of the primary acid that is present in the PA boosters, biofilm bacteria kill is approximately the same. Thus, it is believed that there is no notable difference in efficacy regardless of which primary acid is present in exemplary PA boosters.

Additional data may be generated via MBEC to demonstrate the boosting of the efficacy of PA disinfectants/sanitizers comprising peracids other than PAA by an exemplary foaming PA using boosters comprising alternative primary acids. Expected data are set forth in Table 9 (along with the relevant dilutions).

TABLE 9

MBEC Test Results of *P. aeurginosa* biofilm (log CFU) upon exposure to PA in the absence or presence of High Foam Booster[1]

| | Booster | | |
|---|---|---|---|
| Total PA (ppm) | None | Glycolic acid (Example A) | Lactic acid (Example O) |
| 0 | NA[2] | FAIL | FAIL |
| 10 | FAIL | FAIL | FAIL |
| 25 | FAIL | FAIL | FAIL |
| 50 | FAIL | PASS | PASS |
| 100 | FAIL | PASS | PASS |
| 200 | FAIL | PASS | PASS |

[1]At 12.8 oz/gal Booster.
[2]Not applicable.

As can be seen in Table 9, it is expected that the efficacy boost provided by exemplary foaming boosters formulated with either glycolic acid vs. lactic acid as the primary acid (respectively, Examples A and O), is approximately the same.

Referencing Table 10, additional data is generated using various industry standards to demonstrate the boosting of the efficacy of Proxitane® EQ Peracetic Acid by an exemplary foaming PA booster pursuant to Example A and an exemplary no/low foaming PA booster pursuant to Example I (dose rates for foaming PA boosters are in rows 2-6 and dose rates for low/no foaming PA boosters are in rows 7-11).

TABLE 10

| ASTM/ AOAC Method Corre- llation | Study | Organism | Dose Rate Oz (PAA:PA Booster: Water) | Contact Time | Surface | Result w/PA Booster | Result w/o PA Booster | PAA ppm | Per- oxide ppm | Primary Acid ppm | Pri- mary + Ancillary acid ppm | Short Chain Acid ppm |
|---|---|---|---|---|---|---|---|---|---|---|---|---|
| AOAC 955.14; 955.15; 964.02 | Dis- infection | *P. aeruginosa* ATCC 15442, *S. aureus* ATCC 6538, *S. enterica* ATCC 10708, *S. enteritidis* ATCC 13076, *E. coli* O157:H7 ATCC 35150, *L. monocytogenes* ATCC 19111, *C. jejuni* ATCC 29428, *C. Sakazakii* ATCC 29544, *E. coli* O26;H11 ATCC | 0.4:12.8: 114.8 (0.4 oz PAA, 12.8 oz PA Foaming Booster, 114.8 oz Water) | 5 minute | Stainless Steel | Pass | Mixed | 165 | 685 | 588 | 1088 | 1488 |

TABLE 10-continued

| ASTM/ AOAC Method Corre-llation | Study | Organism | Dose Rate Oz (PAA:PA Booster: Water) | Contact Time | Surface | Result w/PA Booster | Result w/o PA Booster | PAA ppm | Per-oxide ppm | Primary Acid ppm | Pri-mary + Ancillary acid ppm | Short Chain Acid ppm |
|---|---|---|---|---|---|---|---|---|---|---|---|---|
| ASTM E1153 | NFC | *S. aureus* ATCC 6538, *K. Aero* 10348 | 0.2:12.8:115 | 5 minute | Glass | Pass | NA | 80 | 333 | 588 | 1088 | 1488 |
| AOAC 960.09 | Food Contact | *E. Coli* 11229, *S. Aureus* ATCC 6538, *L. monocytogenes* ATCC 19111, *P. aeruginosa* ATCC 15442, *S. enterica* ATCC 10708 | 0.2:12.8:115 | 0.5 minute | Glass | Pass | Pass | 80 | 333 | 588 | 1088 | 1488 |
| ASTM E2871-19 | Biofilm Kill | *P. aeruginosa* ATCC 15442, *S. aureus* ATCC 6538, *L. monocytogenes* ATCC 49594 | 2:12.8:113.8 | 10 minute (5 min staph) | Borosilicate Glass | Pass | Fail | 828 | 3400 | 588 | 1088 | 1488 |
| AOAC 955.17 | Fungicidal | *T. intergitales* ATCC 9533 | 2:12.8:113.2 | 10 minute | Stainless Steel | Pass | Fail | 828 | 3400 | 588 | 1088 | 1488 |
| AOAC 955.14; 955.15; 964.02 | Dis-infection | *P. aeruginosa* ATCC 15442, *S. aureus* ATCC 6538, *S. enterica* ATCC 10708, *S. enteritidis* ATCC 13076, *E. coli* O157:H7 ATCC 35150, *L. monocytogenes* ATCC 19111, *C. jejuni* ATCC 29428, *C. Sakazakii* ATCC 29544 | 0.5:0.5:127 (0.5 oz PAA, 0.5 oz No/ Low Foaming PA Booster: 127 oz water) | 5 minute | Stainless Steel | Pass | Mixed | 205 | 750 | 391 | 490 | 646 |
| AOAC 960.09 | Food Contact | *E. Coli* 11229, *S. Aureus* ATCC 6538, *L. monocytogenes* ATCC 19111, *P. aeruginosa* ATCC 15442, *S. enterica* ATCC 10708 | 0.2:0.5:127.3 | 0.5 minute | Glass | Pass | Pass | 80 | 333 | 391 | 490 | 646 |
| ASTM E2871-19 | Biofilm KIll | *P. aeruginosa* ATCC 15442, *S. aureus* ATCC 6538, *L. monocytogenes* ATCC 49594 | 2:0.5:125.5 | 10 minute (5 min staph) | Borosilicate Glass | Pass | Fail | 828 | 3400 | 391 | 490 | 646 |
| AOAC 966.04 | Sporicidal | *C. sporogenes* ATCC 3584, *B. Subtilis* ATCC 19659 | 2.5:0.5:125 | 10 minute | Porcelain Penicylinders | Pass | Fail | 828 | 3400 | 391 | 490 | 646 |
| AOAC 955.17 | Fungicidal | *T. intergitales* ATCC 9533 | 2:0.5:125.5 | 10 minute | Stainless Steel | Pass | Fail | 828 | 3400 | 391 | 490 | 646 |

As can be seen in Table 10, a use solution comprising Proxitane® EQ Peracetic Acid and water when applied to a variety of hard surfaces provides for mixed results at best, even when left on a hard surface for a contact time of up to 10 minutes. In comparison, when a use solution comprising an exemplary foaming or no/low foaming PA Booster, Proxitane® EQ Peracetic Acid and water is tested, all of the industry standard tests are passed, even at a contact time as short as 0.5 minutes, and even a biofilm kill in a time as short as 5 minutes or less.

Additional data may be generated using industry standards to demonstrate the boosting of the efficacy of PA disinfectants/sanitizers comprising peracids other than or in addition to PAA by an exemplary foaming PA booster pursuant to Example A. For example, such a PA disinfectant/sanitizer concentrate may be diluted with water to make a PA use solution or may mixed with an exemplary foaming or no/low foaming booster and water to make a PA use solution in accordance with the respective dilutions set forth in Table 10, and tested via the industry standard methods. The expected results are set forth in Table 11 for foaming PA boosters and in Table 12 for no/low foaming PA boosters.

TABLE 11

| ASTM/AOAC Method Correllation | Study | Organism | Contact Time | Surface | Peracid + Booster | Peracid Alone | Peracid PPM |
|---|---|---|---|---|---|---|---|
| AOAC 955.14; 955.15; 964.02 | Disinfection | *P. aeruginosa* ATCC 15442, *S. aureus* ATCC 6538, *S. enterica* ATCC 10708 | 5 minute | Stainless Steel | Pass | Fail | <165 ppm |
| ASTM E2871-19 | Biofilm Kill | *P. aeruginosa* ATCC 15442, *S. aureus* ATCC 6538 | 10 minute | Borosilicate Glass | Pass | Fail | <800 ppm |

TABLE 11-continued

| ASTM/AOAC Method Correllation | Study | Organism | Contact Time | Surface | Peracid + Booster | Peracid Alone | Peracid PPM |
|---|---|---|---|---|---|---|---|
| AOAC 955.17 | Fungicidal | *T. intergitales* ATCC 9533 | 10 minute | Stainless Steel | Pass | Fail | <800 ppm |

TABLE 12

| ASTM/AOAC Method Correllation | Study | Organism | Contact Time | Surface | Peracid + Booster | Peracid Alone | Peracid PPM |
|---|---|---|---|---|---|---|---|
| AOAC 955.14; 955.15; 964.02 | Disinfection | *P. aeruginosa* ATCC 15442, *S. aureus* ATCC 6538, *S. enterica* ATCC 10708 | 5 minute | Stainless Steel | Pass | Fail | <205 ppm |
| ASTM E2871-19 | Biofilm KIll | *P. aeruginosa* ATCC 15442, *S. aureus* ATCC 6538 | 10 minute | Borosilicate Glass | Pass | Fail | <800 ppm |
| AOAC 966.04 | Sporicidal | *C. sporogenes* ATCC 3584, *B. Subtilis* ATCC 19659 | 10 minute | Porcelain Penicylinders | Pass | Fail | <800 ppm |
| AOAC 955.17 | Fungicidal | *T. intergitales* ATCC 9533 | 10 minute | Stainless Steel | Pass | Fail | <800 ppm |

As can be seen in Tables 11 and 12, it is believed that when PA use solutions comprising a concentrated PA disinfectant/sanitizer comprising peracids other than (or in addition to PAA) are applied to a variety of hard surfaces they will fail industry standard tests, even when left on a hard surface for a contact time of up to 10 minutes. In comparison, it is believed that when a PA use solution comprising an exemplary foaming or an exemplary no/low foaming PA Booster, the same concentrated PA disinfectant/sanitizer comprising peracids other than (or in addition to PAA) and water is tested, all of the industry standard tests will be passed, even at a contact time as short as 0.5 minutes, and even a biofilm kill in a time as short as 5 minutes or less.

Additional Examples

A first exemplary aqueous composition comprising:

a. a primary organic acid selected from: glycolic acid, benzoic acid, fumaric acid, caprylic acid, lactic acid, proprionic acid, a salt of any one of the foregoing organic acids and combinations thereof;

b. an ancillary organic acid that is different from the primary organic acid, the ancillary organic acid having a:

i. carbon chain length of C6 or less, and ii. at least one pKa of from about 2 to about 7;

b. a biodispersant selected from: alkyl sulfosuccinate, alkyl sulfoacetate, alkylamide hydrolysate; a metal salt of any one the foregoing and combinations thereof;

c. a chelant; and e. a pH buffering agent;

wherein the aqueous composition has a pH of from about 3 to about 4.

A second exemplary composition according to the first exemplary composition, wherein the composition is a foaming composition that further comprises:

a. the primary organic acid at from about 0.1% to about 30% by weight of the aqueous composition; and b. a foaming agent selected from: an ethoxylated alcohol, an amine oxide, a sulfonic acid and combinations thereof.

A third exemplary composition according to either one of the first and second exemplary compositions, wherein the primary organic acid is glycolic acid.

A fourth exemplary aqueous composition according to the third exemplary composition, wherein the glycolic acid is present in the aqueous composition at from about 0.1% to about 30% by weight of the aqueous composition.

A fifth exemplary composition according to any one of the preceding exemplary compositions, wherein the biodispersant is selected from: sodium dioctyl sulfosuccinate, disodium lauryl sulfosuccinate, sodium lauryl sulfoacetate and combinations thereof A sixth exemplary composition according to any one of the preceding exemplary compositions, wherein the biodispersant is sodium dioctyl sulfosuccinate.

A seventh exemplary composition according to the sixth exemplary composition, wherein the sodium dioctyl sulfosuccinate is present in the aqueous composition at from about 0.1% to about 10% by weight of the aqueous composition.

An eighth exemplary composition according to the first exemplary composition, wherein the composition is a low or no foaming composition that:

a. comprises the primary organic acid at from about 1% to about 15% by weight of the aqueous composition; and b. further comprises:

i. a defoamer; and ii. a coupling agent.

A ninth exemplary composition according to the eighth exemplary composition, wherein the primary organic acid is glycolic acid.

A tenth exemplary composition according to the ninth exemplary composition, wherein the glycolic acid is present in the aqueous composition at from about 1.0% to about 15% by weight of the aqueous composition.

An eleventh exemplary composition according to any one of the eighth through tenth exemplary compositions, wherein the biodispersant is selected from: sodium dioctyl sulfosuccinate, disodium lauryl sulfosuccinate, sodium lauryl sulfoacetate and combinations thereof.

A twelfth exemplary composition according to the eleventh exemplary composition, wherein the biodispersant is sodium dioctyl sulfosuccinate.

A thirteenth exemplary composition according to the twelfth exemplary composition, wherein the sodium dioctyl sulfosuccinate is present in the aqueous composition at from about 1.0% to about 10% by weight of the aqueous composition.

A fourteenth exemplary composition according to any one of the eighth through thirteenth exemplary compositions, wherein the defoamer is polyoxypropylene-polyethylene block copolymer and is present in the aqueous composition at from about 4% to about 15% by weight of the aqueous composition.

A fifteenth exemplary composition according to any one of the eighth through fourteenth exemplary compositions, wherein the coupling agent is iminodipropate alanate that is present in the aqueous composition at from about 1% to about 10% by weight of the aqueous composition.

A sixteenth exemplary clear aqueous composition consisting of:

a. at least one organic acid selected from:
   i. glycolic acid,
   ii. glycolic acid and an acid selected from: benzoic acid, a metal salt of benzoic acid, fumaric acid, a metal salt of fumaric acid, caprylic acid, a metal salt of caprylic acid, lactic acid, a metal salt of lactic acid, proprionic acid, a metal salt of proprionic acid and combinations thereof, or
   iii. at least two organic acids selected from: benzoic acid, a metal salt of benzoic acid, fumaric acid, a metal salt of fumaric acid, caprylic acid, a metal salt of caprylic acid, lactic acid, a metal salt of lactic acid, proprionic acid, a metal salt of proprionic;
b. a biodispersant selected from: a sodium salt of an alkyl sulfosuccinate, a sodium salt of an alkyl sulfoacetate and combinations thereof;
c. a chelant;
d. an acidifying agent;
e. a pH buffering agent; and
f. optionally:
   i. a foaming agent selected from: an ethoxylated alcohol, an amine oxide, a dodecylbenzene sulfonic acid and combinations thereof; or
   ii. a defoamer and a coupling agent;

wherein the aqueous composition has a pH of from about 3 to about 4.

A seventeenth exemplary composition according to any one of the first through sixteenth exemplary compositions, wherein the exemplary composition is substantially free of one, two or all three of the following:

i. peracids,
ii. peroxides, wherein the peroxides may be selected from: organic peroxides, inorganic peroxides and combinations thereof, and iii. inorganic acids.

A first exemplary method of boosting biofilm kill of a peracid disinfectant/sanitizer use solution made from a peracid containing disinfectant/sanitizer concentrate, wherein:

(a) a first peracid disinfectant/sanitizer use solution:
   i. comprises the aqueous peracid disinfectant/sanitizer concentrate and water,
   ii. contains less than 800 ppm total of peracids selected from: peroxyacetic acid; peroxyoctanoic acid; peroxysulfonic acid; peroxyformic acid; and combinations thereof,
   iii. has a pH of from about 1 to about 5, and
   iv. is characterized by a first efficacy of equal to or less than about a 5 $\log_{10}$ reduction of a *Pseudomonas aeruginosa* biofilm after contact therewith for 10 minutes or more pursuant to ASTM E2871-12 (approved Apr. 1, 2012 & published in June of 2012); and
(b) a second peracid disinfectant/sanitizer use solution:
   i. comprises a composition according to any one of the first through seventeenth exemplary compositions, the aqueous peracid disinfectant/sanitizer concentrate and water,
   ii. contains less than 800 ppm total of peracids selected from: peroxyacetic acid; peroxyoctanoic acid; peroxysulfonic acid; peroxyformic acid; and combinations thereof;
   iii. has a pH of from about 1 to about 5, and
   iv. is characterized by a boosted efficacy equal to or greater than 6 $\log_{10}$ reduction of *Pseudomonas aeruginosa* biofilm after contact therewith for 10 minutes or more pursuant to ASTM E2871-12 (approved Apr. 1, 2012 & published in June of 2012);

the method comprising:

(a) making the second peracid disinfectant/sanitizer use solution by mixing together any one of the first through seventeenth exemplary compositions, the aqueous peracid disinfectant/sanitizer concentrate and water, and
(b) applying the second peracid disinfectant/sanitizer use solution to a hard surface.

A second exemplary method of boosting an efficacy of a concentrated disinfectant/sanitizer that comprises one or more peracids at a total weight percentage of 800 ppm or less by weight of the concentrated disinfectant/sanitizer, the method comprising making a use solution by mixing together the concentrated disinfectant/sanitizer, water and an exemplary composition according to any one of the first through seventeenth exemplary compositions;

wherein:

(a) a use solution consisting of the concentrated disinfectant/sanitizer diluted with water has a first efficacy,
(b) the use solution of (a) has a second efficacy, and
(c) the second efficacy is from about 2 $\log_{10}$ to about 5 $\log_{10}$ cycles greater than the first efficacy against *Pseudomonas aeruginosa* after contact therewith for 10 minutes or more pursuant to ASTM E2871-19 (approved Jan. 1, 2019 & published in February of 2019).

A first exemplary kit comprising:

(a) a first container containing any one of the first through seventeenth exemplary compositions; and
(b) a second container containing an aqueous composition comprising peracetic acid.

A second exemplary kit according to the first exemplary kit, wherein the aqueous composition comprising peracetic acid:

(a) contains from about 4% to about 6% by weight of peracetic acid; and
(b) is substantially free of surfactant.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of any claims that may be presented and is understood not to be limited to the details of structure and operation shown and described in the specification and drawings.

We claim:

1. An aqueous composition comprising:

a. a primary organic acid selected from: glycolic acid, benzoic acid, fumaric acid, caprylic acid, lactic acid, proprionic acid, a salt of any one of the foregoing organic acids and combinations thereof;

b. an ancillary organic acid that is different from the primary organic acid, the ancillary organic acid having a:

i. carbon chain length of C6 or less, and ii. at least one pKa of from about 2 to about 7;

c. a biodispersant selected from: alkyl sulfosuccinate, alkyl sulfoacetate, a hydrolysis reaction products of alkyl amide; a metal salt of any one the foregoing and combinations thereof;

d. a chelant;

e. a pH buffering agent;

f. a defoamer; and g. a coupling agent, wherein the coupling agent is iminodipropate alanate present in the aqueous composition at a concentration of from about 1% to about 10% by weight of the aqueous composition;

wherein the aqueous composition:

(a) has a pH of from about 3 to about 4; and (b) is substantially free of:

i. peracids, ii. peroxides selected from: organic peroxides, inorganic peroxides and combinations thereof, and iii. inorganic acids.

2. The aqueous composition of claim 1, wherein the biodispersant is selected from: sodium dioctyl sulfosuccinate, disodium lauryl sulfosuccinate, sodium lauryl sulfoacetate and combinations thereof.

3. The aqueous composition of claim 1, wherein the biodispersant is sodium dioctyl sulfosuccinate.

4. The aqueous composition of claim 3, wherein the sodium dioctyl sulfosuccinate is present in the aqueous composition at from about 0.1% to about 10% by weight of the aqueous composition.

5. The aqueous composition of claim 1 comprises the primary organic acid at from about 1% to about 15% by weight of the aqueous composition.

6. The aqueous composition according to claim 1, wherein the primary organic acid is glycolic acid.

7. The aqueous composition of claim 1, wherein the biodispersant is selected from: sodium dioctyl sulfosuccinate, disodium lauryl sulfosuccinate, sodium lauryl sulfoacetate and combinations thereof.

8. The aqueous composition of claim 6, wherein the biodispersant is sodium dioctyl sulfosuccinate.

9. The aqueous composition of claim 8, wherein the sodium dioctyl sulfosuccinate is present in the aqueous composition at from about 1.0% to about 10% by weight of the aqueous composition.

10. The aqueous composition of claim 1, wherein the defoamer is polyoxypropylene-polyethylene block copolymer and is present in the aqueous composition at from about 4% to about 15% by weight of the aqueous composition.

11. A method of boosting biofilm kill of a peracid disinfectant/sanitizer use solution made from a peracid containing disinfectant/sanitizer concentrate, wherein:

(a) a first peracid disinfectant/sanitizer use solution:

i. comprises the aqueous peracid disinfectant/sanitizer concentrate and water, ii. contains less than 800 ppm total of peracids selected from: peroxyacetic acid;

peroxyoctanoic acid; peroxysulfonic acid; peroxyformic acid; and combinations thereof, iii. has a pH of from about 1 to about 5, and iv. is characterized by a first efficacy of equal to or less than about a 5 $\log_{10}$ reduction of a *Pseudomonas aeruginosa* biofilm after contact therewith for 10 minutes or more pursuant to ASTM E2871-12 (approved Apr. 1, 2012 & published in June of 2012); and (b) a second peracid disinfectant/sanitizer use solution:

i. comprises the aqueous composition of claim 1, the aqueous composition of claim 1 and water, ii. contains less than 800 ppm total of peracids selected from: peroxyacetic acid; peroxyoctanoic acid; peroxysulfonic acid; peroxyformic acid; and combinations thereof;

iii. has a pH of from about 1 to about 5, and iv. is characterized by a boosted efficacy equal to or greater than 6 $\log_{10}$ reduction of *Pseudomonas aeruginosa* biofilm after contact therewith for 10 minutes or more pursuant to ASTM E2871-12 (approved Apr. 1, 2012 & published in June of 2012);

the method comprising:

(a) making the second peracid disinfectant/sanitizer use solution by mixing together the aqueous composition of claim 1, the aqueous peracid disinfectant/sanitizer concentrate and water, and (b) applying the second peracid disinfectant/sanitizer use solution to a hard surface.

12. A clear aqueous composition consisting of:

a. at least one organic acid selected from:

i. glycolic acid, ii. glycolic acid and an acid selected from: benzoic acid, a metal salt of benzoic acid, fumaric acid, a metal salt of fumaric acid, caprylic acid, a metal salt of caprylic acid, lactic acid, a metal salt of lactic acid, proprionic acid, a metal salt of proprionic acid and combinations thereof, or iii. at least two organic acids selected from: benzoic acid, a metal salt of benzoic acid, fumaric acid, a metal salt of fumaric acid, caprylic acid, a metal salt of caprylic acid, lactic acid, a metal salt of lactic acid, proprionic acid, a metal salt of proprionic;

b. a biodispersant selected from: a sodium salt of an alkyl sulfosuccinate, a sodium salt of an alkyl sulfoacetate and combinations thereof;

c. a chelant;

d. an acidifying agent;

e. a pH buffering agent; and f. a defoamer and a coupling agent;

wherein the aqueous composition has a pH of from about 3 to about 4; and wherein the coupling agent is iminodipropate alanate present in the aqueous composition at a concentration of from about 1% to about 10% by weight of the aqueous composition.

13. A kit comprising:

(a) a first container containing the aqueous composition of claim 1; and (b) a second container containing an aqueous composition comprising peracetic acid.

14. The kit of claim 13, wherein the aqueous composition comprising peracetic acid:

(a) contains from about 4% to about 6% by weight of peracetic acid; and (b) is substantially free of surfactant.

15. A method of boosting an efficacy of a concentrated disinfectant/sanitizer that comprises one or more peracids at a total weight percentage of 800 ppm or less by weight of the concentrated disinfectant/sanitizer, the method comprising:

(a) making a use solution by mixing together the concentrated disinfectant/sanitizer, water and an aqueous composition comprising:

i. a primary organic acid selected from: glycolic acid, benzoic acid, fumaric acid, caprylic acid, lactic acid, proprionic acid, a salt of any one of the foregoing organic acids and combinations thereof, ii. an ancillary organic acid that is different from the primary organic acid, the ancillary organic acid having a:

(1) carbon chain length of C6 or less, and (2) at least one pKa of from about 2 to about 7, iii. a biodispersant selected from: alkyl sulfosuccinate, alkyl sulfoacetate, a hydrolysis reaction products of alkyl amide; a metal salt of any one the foregoing and combinations thereof, iv. a chelant;

v. a pH buffering agent;

vi. a defoamer; and vii. a coupling agent, wherein the coupling agent is iminodipropate alanate present in the aqueous composition at a concentration of from about 1% to about 10% by weight of the aqueous composition; and wherein the aqueous composition:

(1) has a pH of from about 3 to about 4; and (2) is substantially free of:

A. peracids,

B. peroxides selected from: organic peroxides, inorganic peroxides and combinations thereof, and C. inorganic acids;

wherein:

(a) a use solution consisting of the concentrated disinfectant/sanitizer diluted with water has a first efficacy, (b) the use solution of (a) made by mixing together the concentrated disinfectant/sanitizer, water, and the aqueous composition has a second efficacy, and (c) the second efficacy is from about 2 $\log_{10}$ to about 5 $\log_{10}$ cycles greater than the first efficacy against *Pseudomonas aeruginosa* after contact therewith for 10 minutes or more pursuant to ASTM E2871-19 (approved Jan. 1, 2019 & published in February of 2019).

* * * * *